(12) United States Patent
Mietzel

(10) Patent No.: US 6,251,008 B1
(45) Date of Patent: Jun. 26, 2001

(54) HUSKER ROLLS

(75) Inventor: Dennis O. Mietzel, Columbus, WI (US)

(73) Assignee: Hughes Company, Inc., Columbus, WI (US)

( * ) Notice: Subject to any disclaimer, the term of this patent is extended or adjusted under 35 U.S.C. 154(b) by 0 days.

(21) Appl. No.: 09/356,146

(22) Filed: Jul. 19, 1999

(51) Int. Cl.$^7$ .................................................. A01F 11/06
(52) U.S. Cl. ............................................................ 460/32
(58) Field of Search ........................... 56/16.4 A, 16.4 B, 56/16.4 C, 62, DIG. 1, 51, 52; 460/31, 32, 33, 27, 28, 30, 34–37

(56) References Cited

U.S. PATENT DOCUMENTS

| | | | |
|---|---|---|---|
| 2,584,180 | * 2/1952 | Aasland | 460/32 |
| 2,768,626 | * 10/1956 | Pelowski | 460/32 |
| 2,905,181 | * 9/1959 | Nelson | 460/32 |
| 3,098,491 | * 7/1963 | Mitchell | 460/32 |
| 4,127,979 | * 12/1978 | Hoch | 56/1 |
| 4,807,654 | 2/1989 | Mietzel et al. | |
| 5,282,352 | * 2/1994 | Schoolman | 56/62 |
| 5,451,184 | 9/1995 | Mietzel . | |

OTHER PUBLICATIONS

A&K Development Company, Husker Roll Promotional Literature—Jul. 1998.

* cited by examiner

*Primary Examiner*—Robert E. Pezzuto
(74) *Attorney, Agent, or Firm*—Foley & Lardner

(57) ABSTRACT

A husker roll for use in an agricultural product separating apparatus, such as a corn husking apparatus. The husker roll includes a plurality of axially extending ridges or flights which protrude radially from a cylindrical base segment of the roll. The cylindrical base segment may have a circular or elliptical cross-section. The axially extending flights may extend substantially straight or in a helical fashion along the length of the roll. The flights are spaced apart around the circumference of the base segment so as to define grooves between the flights, wherein the circumferential width of the grooves is larger than the circumferential width of the flights themselves. Preferably, the circumferential width of the grooves between the flights is approximately three times the circumferential width of the base portion of the flights. The husker rolls are mounted adjacent to each other in an agricultural product separating apparatus and rotated such that husks or other materials to be removed from an agricultural product are grasped between the flights of adjacent rolls and pulled from the product as the rolls are rotated. The large groove formed between the flights on the rolls allows an ear of corn or other agricultural product to ride lower on the rolls, more closely to the point where the flights engage between the rolls, thereby improving the ability of the rolls to grasp and remove material from the product. The husker rolls may be provided with a helical recess formed therein which extends across the axially extending flights, and a continuous rib extending radially from and axially along the husker roll, parallel to the flights, to improve the ability of the rolls to remove stalks or other large debris from a separating apparatus employing the rolls.

35 Claims, 6 Drawing Sheets

HUSKER ROLLS

FIELD OF THE INVENTION

The present invention relates generally to agricultural product processing equipment and, more particularly, to methods and devices for stripping husks from agricultural products such as ears of corn, and rotating husker rolls for such devices.

BACKGROUND OF THE INVENTION

Harvested ears of corn come from the field sheathed in an enclosing husk, often surrounded by flag leaves, and occasionally still attached to portions of a stalk. For food processing, especially in the preparation of sweet corn for human consumption, all of the husk, leaves, and stalk must be removed from the ears containing the edible kernels of corn.

Husking is conventionally achieved by feeding the bulk unhusked corn onto conveyor tables formed with two or more parallel rows of husker rolls mounted on rotating axles. The rolls are typically molded from rubber or other resilient material and have a number of parallel ridges or flights extending therefrom. The flights may extend in parallel axially straight along the length of the husker rolls, or may extend circumferentially as well as axially to define a segment of a helix, to provide auger-like advancement of ears of corn from an infeed end of the husker apparatus to a discharge end thereof. Such husker rolls may be circular or elliptical in cross-section. Exemplary prior art husker rolls are described in U.S. Pat. No. 4,807,645, the disclosure of which is incorporated herein by reference.

Many configurations of rolls may be employed to form a husker apparatus, although two types are predominant. In the first type, the surfaces of adjacent husker rolls are continuously meshed together. In the second, the circumferential surfaces of adjacent husker rolls are in contact, but are not meshed together. Adjacent corn husker rolls having radially extending flights that are meshed together have the desirable effect of firmly engaging the corn husks as the ears of corn pass over the rolls for removing the husks from the ears. However, such designs, while effective at discharging thin husk material between engaged rolls, may not be able to pass much thicker debris, such as pieces of stalk, without bending the axles on which the rolls are mounted. Axle flex can result in an over-tight grip, which can prevent release of a stalk or other debris, producing a blockage of the flow of ears along the husker conveyor table. In such a case, the husker rolls will turn ineffectively, eventually fraying or wearing away the obstruction, but in the process causing accelerated wear of the rolls, requiring premature replacement of at least some segments of the roll.

This problem may be solved by employing the husker rolls described in U.S. Pat. No. 5,451,184, issued to Dennis O. Mietzel, and incorporated herein by reference. This patent describes a corn husking device, and rotating husker rolls therefor, wherein radially extending flights of adjacent rolls are meshed with one another, and the rolls are rotated toward one another to engage husks therebetween. A helical recess is formed on portions of one or both adjacent rolls, extending along the length of the roll. The roll recesses provided relief for larger diameter debris and stalks, alleviating the flexing of the roll axles which might otherwise occur. The recesses serve as a relieved auger which advances gripped material. Stalks or other debris gripped in the helical recesses are moved forward at a rate faster than the progress of the ears of corn in the husker apparatus, and are either discharged beneath the roll table or carried along by the recesses to the discharge end of the device. A continuous rib, which may be internally reinforced with a metal blade, may be formed extending through the helical recess along the length of the roll. The rib engages debris within the recess of an adjacent roll by clamping the debris, such as a stalk, within the recess, and pulls the debris out of the recess straight down to be discharged from the device.

Although conventional husker rolls have been used effectively to remove husks from ears of corn, such conventional husker rolls are less effective on corn hybrids which have more husk layers and more tightly wrapped husks. Furthermore, corn silk wrapping and the build up of crushed kernels between radially extending flights are two problems which commonly occur with conventional husker rolls. Therefore, an improved and more effective husker roll is desired.

SUMMARY OF THE INVENTION

The present invention provides an improved husker roll for use in an agricultural product separating apparatus, such as a corn husking device. A husker roll in accordance with the present invention is generally cylindrical in shape. A plurality of flights or ridges protrude radially from a cylindrical base segment of the roll, and extend axially along the length thereof. The radially extending flights define grooves between them, and are spaced apart on the base segment such that the circumferential width of the grooves is larger than the circumferential width of the flights themselves. Preferably, the circumferential width of the grooves between the flights is approximately three times the circumferential width of the flights themselves. The base segment and the flights may be made of a resilient material mounted on a metal core cylinder. The cylindrical base segment may be perfectly circular in cross-section, or may have an elliptical cross-section. The flights may extend axially straight along the length of the roll, or may be formed to define a protruding helical path along the base segment.

A husker roll in accordance with the present invention may also include a helically extending recess formed therein, wherein the recess cuts across the flights and extends radially below the level of the grooves defined between the flights. A continuous rib may be formed protruding radially from the cylindrical base segment of the roll and extend axially along the length thereof. The rib may have a circumferential width corresponding to that of the flights, and may extend above the level of the grooves defined between the flights, and into the helically extending recess formed therein. The rib may be positioned on the cylindrical base segment between two flights formed thereon so as to define a groove between the rib and an adjacent flight, wherein the groove has a circumferential width approximately equal to the circumferential width of the rib. The rib may be formed of a resilient material which overlies a metallic insert.

A plurality of husker rolls in accordance with the present invention may be mounted together coaxially in series, e.g., on a rotatable axle, to form a husker roll assembly for a husking apparatus. The husker rolls in the husker roll assembly may be mounted coaxially in the husker roll assembly such that the ends of radially extending flights of adjacent husker rolls are aligned with each other, or such that the ends of radially extending flights of husker rolls in the husker roll assembly are aligned with the grooves between flights of adjacent husker rolls. Preferably, the ends of flights extending radially from a husker roll in accordance with the present invention are aligned with the centers of the grooves between the flights of adjacent husker rolls when mounted coaxially with other such husker rolls in the husker roll assembly.

A plurality of husker roll assemblies may be rotatably mounted on a frame to provide a device for, e.g., effectively removing the husks from ears of corn. The husker roll assemblies are preferably mounted adjacent to each other such that adjacent husker rolls in accordance with the present invention are engaged with each other such that when a flight extending radially from a first roll on a first husker roll assembly in the device is positioned facing a second flight extending from a second roll in a second husker roll assembly in the device the facing first and second flights are positioned adjacent to each other (i.e., one above the other). In such an arrangement, portions of the husks of ears of corn on the table formed by the plurality of husker roll assemblies will be grasped by the opposed and engaged extending flights of adjacent rolls to thereby pull the husks from the ears of corn as the rolls are rotated toward each other. In accordance with the present invention, a wide groove is provided between adjacent flights on a husker roll. This allows an ear of corn to ride low on the husking device table between adjacent husker rolls, close to the engaging flights, thereby improving both the likelihood that a piece of the corn husk will be grasped between the roll's radially extending flights and the amount of husk grasped, and, therefore, the strength with which the portion of the husk is grasped to pull the husk from the ear of corn. Thus, husker rolls in accordance with the present invention provide improved effectiveness in removing husks from ears of corn. Husker rolls having wide grooves between flights in accordance with the present invention also reduce undesirable corn silk wrapping and the build up of crushed kernels between flights.

Where helical recesses are formed in the corn husker rolls, the corn husker rolls are preferably mounted in the husking device such that the helical recesses of adjacent rolls are aligned with each other. The helical recesses thus form recesses in the husking device table though which pieces of debris which are too thick to pass between the opposing flights of adjacent husker rolls may be discharged beneath or moved toward the discharge end of the table formed by the husker roll assemblies. The radially extending rib further aids in separating thicker debris from the ears. The ribs extending from the rolls in adjacent husker roll assemblies in the apparatus are preferably positioned to engage one above the other in the grooves formed between the ribs and adjacent flights as the rolls are turned against one another. The ribs preferably extend across the helical recess, thus serving to clamp an object within the helical recess and to pull large debris out of the recess straight down to be discharged from the apparatus. Because the ribs represent only a small portion of the circumference of the rolls, the effect of the rotating rolls is an intermittent tugging or impact on objects carded in the recesses.

Other objects, features, and advantages of the invention will be apparent from the following detailed description and accompanying drawings.

DETAILED DESCRIPTION OF THE INVENTION

Figure 1:
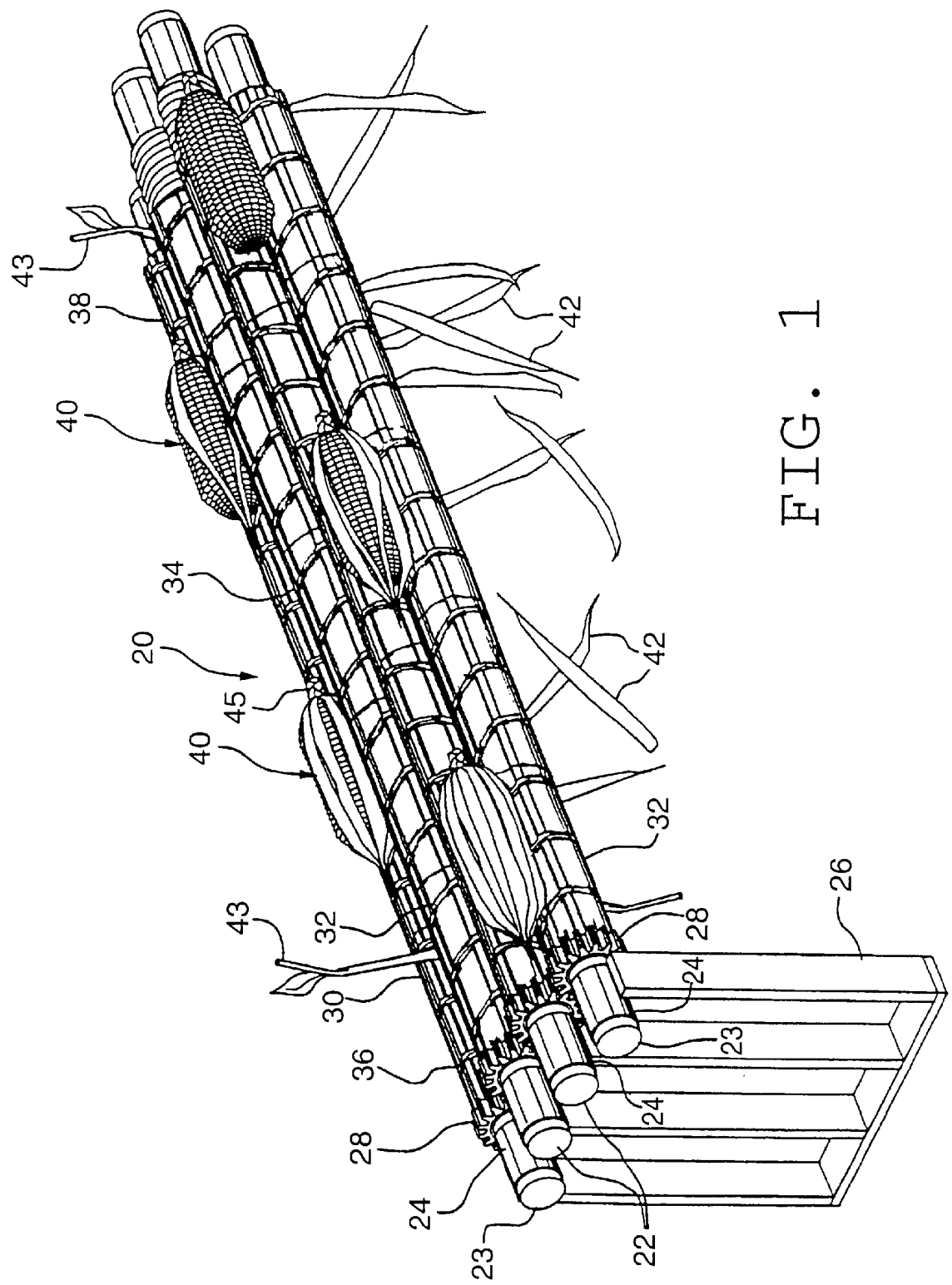
FIG. 1 is a perspective view of a corn husking apparatus employing husker rolls in accordance with the present invention in the process of removing husks from ears of corn.
Figure 2:
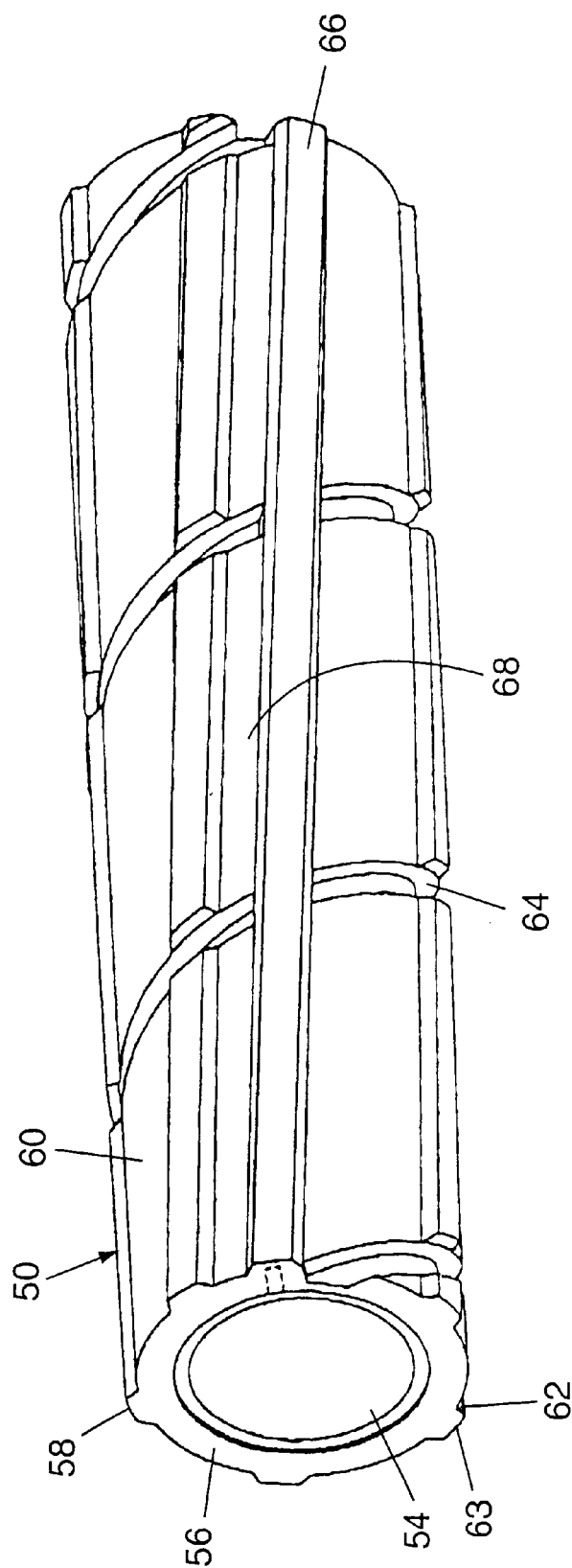
FIG. 2 is a perspective view of a husker roll in accordance with the present invention.

The present invention provides an improved husker roll for an agricultural product separating apparatus, such as a corn husking apparatus. An exemplary corn husking apparatus 20 employing husker rolls in accordance with the present invention is illustrated in FIG. 1. It should be understood, however, that a husker roll in accordance with the present invention may be employed in agricultural product separating devices employed for purposes other than corn husking.

The exemplary corn husking apparatus 20 has two pairs of rotatable axles 22 and 23 which are mounted on bearings 24 which, in turn, are connected to a frame 26. (For clarity, only a fragment of the frame 26 is shown in FIG. 1.) A spur gear 28 is fixed to each axle 22, 23. The gears 28 are interengaged and driven, e.g., by a motor (not shown), in a conventional manner. The axles 22 and 23 may be driven at speeds of approximately 300 rpm, although greater or lesser speeds may be utilized depending on particular husking conditions. Within each pair of axles, an upper axle 22 is typically positioned higher than a lower axle 23. The interengaged gears 28 cause each axle 22 and 23 to rotate in a direction opposite to its adjacent neighbor. In the exemplary corn husking apparatus 20 of FIG. 1, the two upper axles 22 are placed adjacent to one another and rotate to turn toward the two lower axles 23.

Husker rolls 30, 32 are mounted to each axle 22, 23 to form a conveyor table 34 with an infeed end 36 and a discharge end 38 opposite the infeed end. In operation, harvested ears 40 of corn are deposited onto the table 34 at the infeed end 36 and progress along the table 34 to be discharged for further processing at the discharge end 38. Conventional portions of the frame 26, not shown in FIG. 1, enclose the table 34 and retain the ears 40 thereon. Harvested ears 40, in addition to being sheathed in husks 42, may have attached stalks 43, and will have protruding shanks 45 which occasionally can become lodged between the rotating rolls 30, 32. Husks 42 and stalks 43 are engaged by the rolls 30, 32 and are drawn through the table 34 and hence separated from the ears 40. Typically, a conveyor (not shown) beneath the table 34 will remove the husks 42 for their disposal. Furthermore, the axles 22, 23 will be supported on the frame 26 at the discharge end 38 to permit stalks and other debris to be discharged axially from the bed 34 if they will not pass through the bed 34.

As the rolls closest to the infeed end 36 of the bed 34 will experience disproportionate wear, each axle 22, 23 is preferably fitted with a plurality of husker rolls, forming a husker roll assembly, with a plurality of such husker roll assemblies positioned adjacent to each other to form a continuous surface for the table 34. In the exemplary corn husking apparatus 20, for example, each axle is fitted with five husker rolls forming a husker roll assembly. Although 20 rolls are employed to form the table 34 of the exemplary corn husking apparatus 20, there are only two distinct roll types, a left-hand roll 30, and a right-hand roll 32. The right-hand rolls 32 are mounted on axles which turn counterclockwise when viewed from the infeed end 36, and the left-hand rolls 30 are mounted on axles which turn clockwise.

Exemplary husker rolls 50 and 52 in accordance with the present invention will now be described in detail with reference to FIGS. 2–5. The rolls 50, 52 may preferably be molded from natural rubber of, for example, approximately 90 Durometer hardness, in a conventional manner. Alternatively, the rolls 50, 52 may be formed of other appropriate resilient material, such as polyurethane, or may be made entirely of metal, preferably steel, and may be cast or machined. Each roll 50, 52 is preferably formed around a cylindrical tube 54, preferably made out of a metal such as steel, to which the resilient material forming the roll 50, 52 is fixed. The cylindrical tube 54, and, therefore, the rolls 50, 52 themselves, may be perfectly circular or elliptical in cross-section. To assist in locking the tube 54 to an axle, inwardly protruding keys 55 may be formed on the inside of the tube 54, in a conventional manner. The locking of the tubes 54 to the axles of the husking apparatus achieves alignment of the rolls on the axles to form a husker roll assembly, as will be described in more detail below.

The resilient portion of a husker roll 50, 52 in accordance with the present invention includes a cylindrical base segment 56 and a plurality of flights or ridges 58 which protrude radially from the base segment 56 and extend axially along the length of the husker roll 50, 52. The plurality of flights 58 may extend in a straight axial orientation along the length of the husker roll 50, 52 (see FIG. 1), or may curve slightly in a circumferential direction as they extend along the length of the husker roll 50 or 52, thereby defining a helix, as illustrated by the exemplary husker rolls 50 and 52 illustrated in FIGS. 2–5. (The flights 58 may define a left-hand helix and a right-hand helix on left-hand and right-hand husker rolls, respectively.) Such flights describe only a fraction of a turn along the length of the rolls 50, 52, and assist in advancing ears 40 of corn along a table of rolls.

The flights 58 are preferably approximately evenly arrayed around the circumference of the base segment 56. In accordance with the present invention, the flights 58 are spaced apart from each other around the circumference of the base segment 56 such that grooves 60 defined by the space between adjacent flights 58 are circumferentially wider than the flights themselves. For example, the flights 58 preferably may be formed such that the widest portion of the radially extending flight is a base portion 62 thereof, where the flight 58 is joined to the base segment 56, and the narrowest portion thereof is an outermost land 63. In accordance with the present invention, the circumferential width of the grooves 60 between flights 58 is larger than the wide base portions 62 of the flights 58. Preferably, as illustrated in FIGS. 2–5, the grooves 60 defined between the radially extending flights 58 are approximately three times as wide as the widest portion, e.g., the base portion 62, of each flight 58. Note that although FIGS. 2–5 illustrate husker rolls 50 and 52 having five radially protruding flights 58 formed thereon, a husker roll in accordance with the present invention may have more or fewer than five flights, provided that the circumferential distance between the flights is larger than the circumferential width of the flights themselves.

A husker roll 50, 52 in accordance with the present invention may, but need not, include a helical recess 64 formed extending along the length of the roll 50, 52. The recesses 64 provide a relief from the pressure of the engaged rolls 50, 52 when an object substantially thicker than a husk is caught between the rolls. The recesses 64 define a relief auger in which larger thickness objects may be advanced along the table 34 of a husking apparatus and are thereby prevented from clogging or obstructing the flow of agricultural products over the surface of the table. The pitch of the helical recesses is chosen to provide a rate of advancement for an object therein which is greater than the rate of advancement of the conveyed product, e.g., ears of corn. Thus, instead of obstructing the flow of product, a stalk, twig, or other large debris caught in the helical recesses 64 will move rapidly forward to the discharge end of the apparatus, carrying along with it preceding agricultural product.

Left-hand and right-hand husker rolls 50, 52 may be identical except for the orientation of the helical recess 64, with left-hand rolls having left-hand helical recesses 64, and right-hand rolls having right-hand helical recesses 64. Each recess 64 may preferably have a side wall toward the inlet end of the recess which extends substantially radially. The opposite wall, facing the radial side wall, may be an inclined recess side wall which is inclined toward the discharge end of the roll, e.g., at an angle of approximately 20.5 degrees with respect to a radial plane.

In an exemplary husker roll 50, 52 in accordance with the present invention, the outer diameter of the roll is approximately 2.8 inches, and the width of the top portion or outer most lands 63 of a flight 58 is approximately 0.31 inches. The length of an exemplary husker roll 50 or 52 is approximately 11.7 inches. The width of the helical recess 64 may be, for example, approximately ¼ inch at the base thereof.

Note that the base segment 56 and the flights 58 preferably have portions thereof which define the helical recess 64. Thus, as illustrated, the helical recess 64 preferably cuts across the flights 58 and has a recessed floor which is located radially inwardly of the surfaces of the grooves 60 formed between the flights 58.

Figure 3:
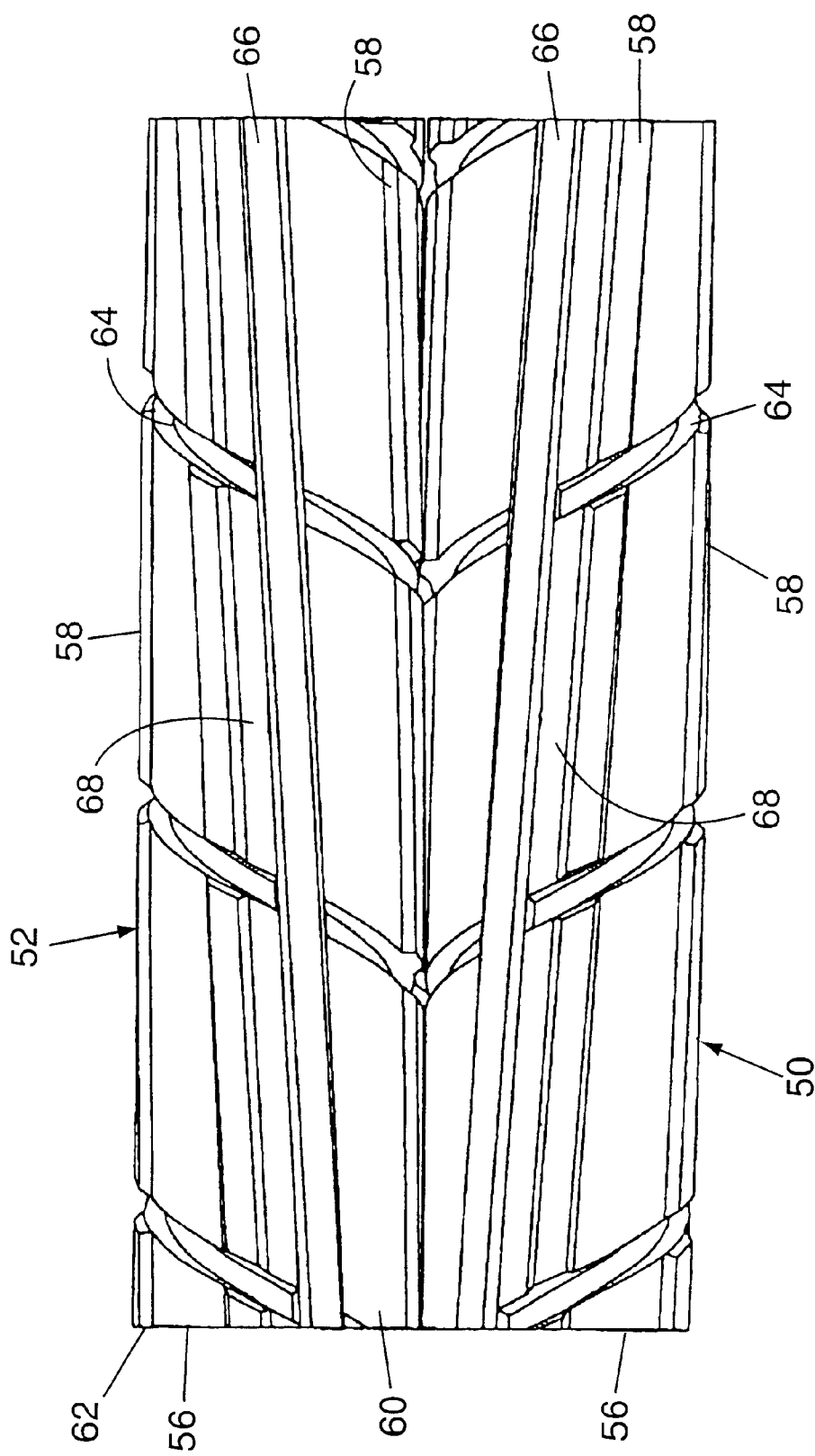
FIG. 3 is a top plan view of engaged left-hand and right-hand husker rolls in accordance with the present invention.
Figure 5:
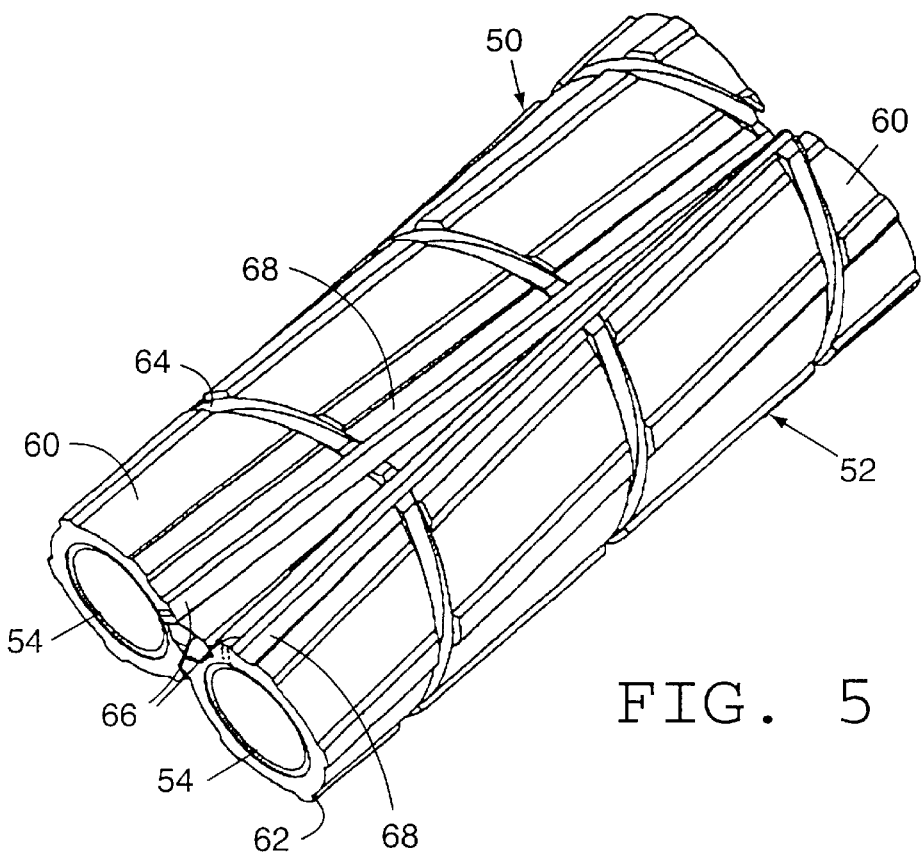
FIG. 5 is a perspective view of the engaged husker rolls in accordance with the present invention of FIG. 3.

Preferably, the helical recesses 64 of adjacent left-hand and right-hand rolls 50 and 52 are aligned with each other, as shown in FIGS. 3 and 5. As the rolls 50 and 52 rotate toward one another, corn husks, or other materials to be removed from an agricultural product, are clamped by the radially extending flights 58 and dragged between the rolls 50 and 52. Shanks 43 and debris which are too thick to pass between the flights 58 of adjacent rolls extend into the helical recesses 64 where they are advanced toward the discharge end or removed underneath the table of the corn husking apparatus or other agricultural product separating apparatus in which the rolls 50, 52 are employed. If the helical recesses 64 of left-hand and right-hand husker rolls 50, 52 are aligned, the effective result is a vertical cavity with a line of contact between the rolls 50, 52 which moves axially toward the discharge end of the apparatus in which the rolls are employed. This cavity is twice the width of a single recess 64. As will be described in detail below, the rolls 50, 52 preferably include continuous radially extending ribs formed thereon which, once per revolution, compress into the cavity formed by the helical recess 64 and exert a tug on any object contained therein.

Figure 4:
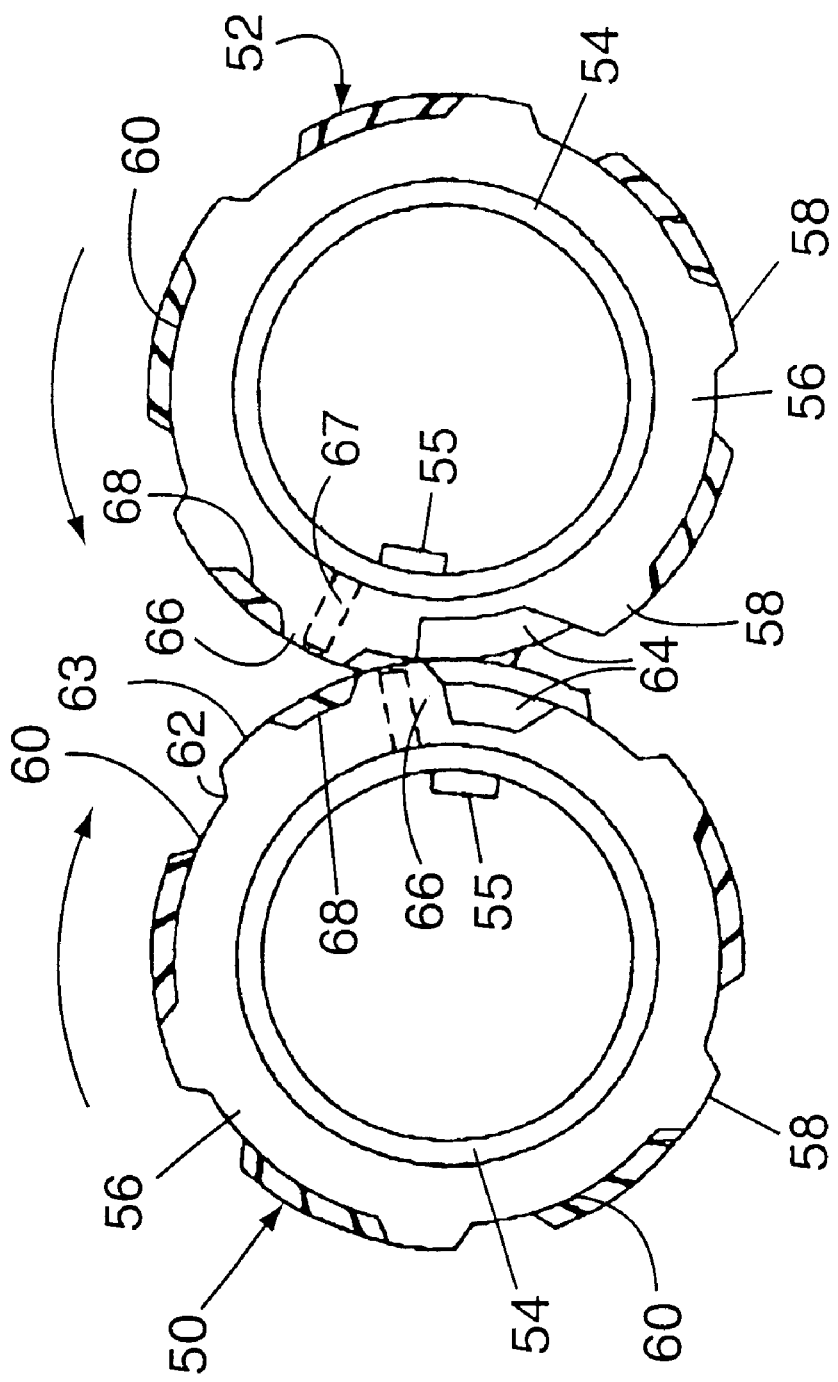
FIG. 4 is a cross-sectional view of the engaged rolls of FIG. 3, shown rotated from the position of FIG. 3.

A husker roll 50, 52 in accordance with the present invention may also have a continuous radially protruding rib 66 formed thereon. The rib 66 preferably extends the same radial distance from the base segment 56 of the husker roll 50, 52 as the flights 58 formed thereon, and preferably has the same circumferential width as the flights 58. The rib 66 preferably extends parallel to the flights 58, i.e., axially straight across or in an inclined helical manner across the roll 50, 52. The rib 66 is preferably formed on the base segment 56 of the husker roll 50, 52 at a distance from an adjacent radially extending flight 58 such that a groove 68 formed between the rib 66 and the adjacent flight 58 has a circumferential width corresponding approximately to the circumferential width of the rib 66 and the flight 58. In this manner, as illustrated in FIG. 4, a corresponding rib 66 and radially extending flight 58 formed on an adjacent husker roll 50, 52 may be engaged in a gear-like manner into the groove 68 formed between the rib 66 and the adjacent flight 58. The rib 66 is preferably continuous, extending axially across the helical recess 64 formed in the rolls 50, 52. The rib 66 may be formed in a conventional manner along with the rest of the husker roll 50, 52. (To facilitate removal of a roll 50, 52 from a rubber forming mold, the rib 66 may be formed at the top of the mold, and may have stepped sides.)

Extended wear life of the continuous rib 66 may be obtained by reinforcing the rib 66 with a steel blade 67, which may be fixed to the internal tube 54, such as by welding. Alternatively, the rib 66 may be made of solid metal.

Figure 6:
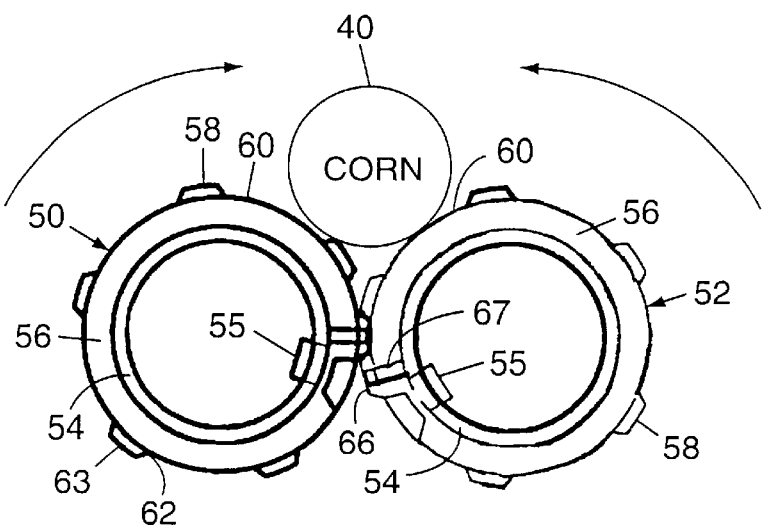
FIG. 6 is a cross-sectional view of engaged husker rolls in accordance with the present invention, showing the enhanced positioning of an ear of corn herein.

When in use in a corn husking or other agricultural product separating apparatus, adjacent rolls 50, 52 are preferably positioned such that, as the rolls 50, 52 turn against one another, the radially extending flights 58 and continuous ribs 66 on each roll are positioned to engage one above the other, as shown in FIG. 4. The flights 58 and ribs 66 thus grab husks between them and adjacent flights 58 and ribs 66 to pull husks from, e.g., ears 40 of corn. As illustrated in FIG. 6, the present invention provides wide grooves 60 between radially extending flights 58 which allows ears 40 of corn to ride low on a table formed by husker rolls 50, 52 in accordance with the present invention, near to the point where the flights 58 and ribs 66 are engaged. This increases the ability of the rolls 50, 52 to grasp husks and remove them from ears 40 of corn. Husker rolls 50, 52 in accordance with the present invention also reduce the winding of corn silk around the rolls 50, 52, and the build up of crushed kernels between the radially extending flights 58 thereof. Corn silk is less likely to stick in the wide grooves 60 between flights 58 of a husker roll in accordance with the present invention, thereby reducing the winding of corn silk around the rolls 50, 52. The wide grooves 60 also reduce the build up of debris, such as crushed corn kernels, therein.

The ribs 66 also serve to clamp debris objects within the helical recess 64, and to pull the debris objects out of the recess straight down to be discharged from the apparatus. Because the ribs 66 represent only a small portion of the circumference of the rolls 50, 52, the effect of the rotating rolls is an intermittent tugging or impact on large debris objects carded in the recesses 64. This tugging, at the rate of up to 300 times a minute, advances a stalk or other debris, which may be as much as six feet long, vertically downward, perhaps only a few inches with each impact, but nonetheless tending to fully discharge the debris prior to the discharge end of the apparatus. A similar effect is produced on shanks 45 protruding from ears 40 of corn. The repeated impact of the rotating ribs 66 tends to shear off a trapped shank 45, allowing the ear 40 of corn supported on the table of the corn husking apparatus to progress unhindered. (The rolls 50, 52 may be positioned adjacent to each other so that the continuous ribs 66 on adjacent rolls are offset from one another, thus providing two instances of gripping and pulling by the ribs 66 per revolution of the rolls.)

Figure 7:
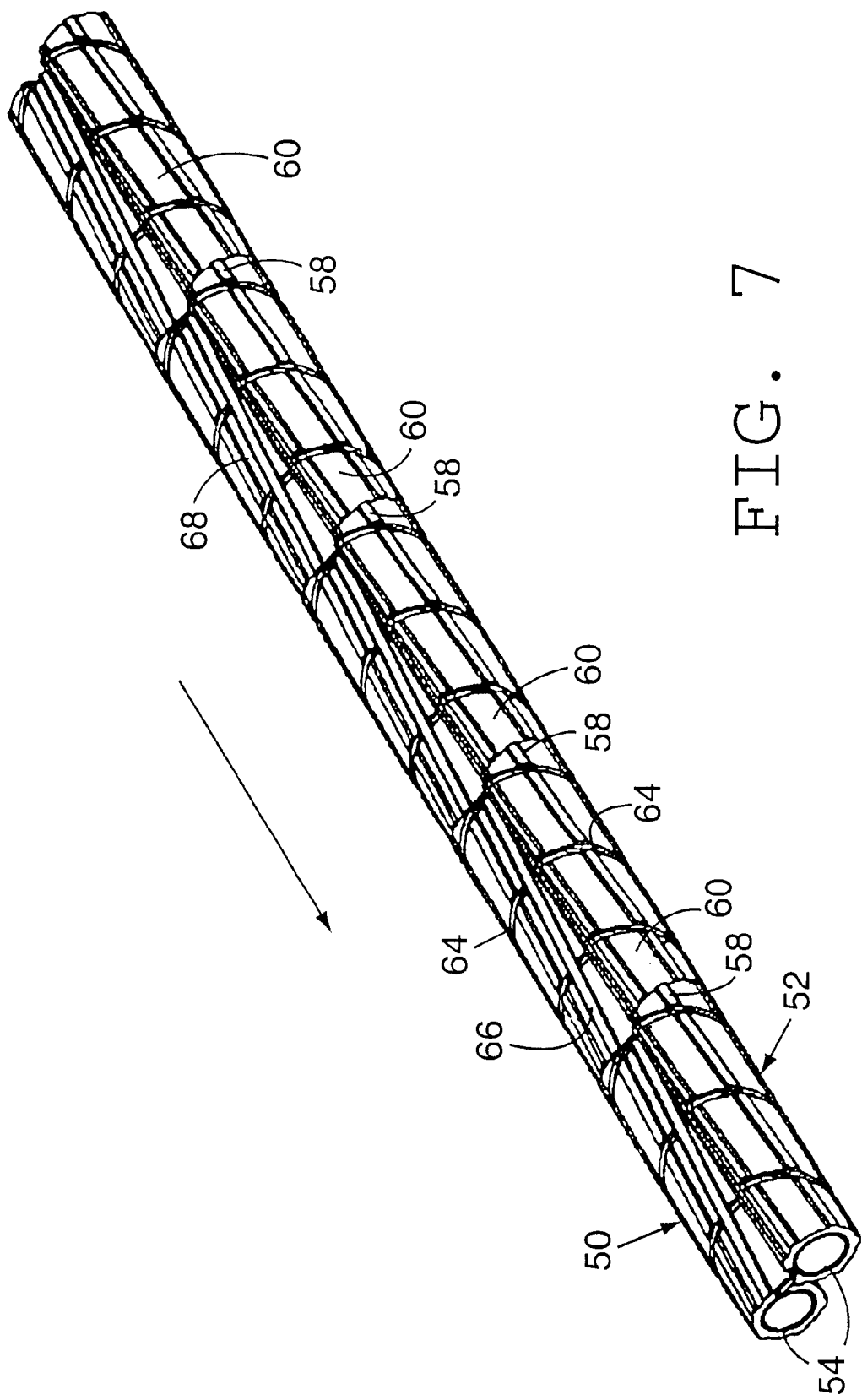
FIG. 7 is a perspective view of engaged left-hand and right-hand husker roll assemblies each including a series of coaxially mounted husker rolls in accordance with the present invention.

As described previously, several husker rolls 50, 52 in accordance with the present invention may be mounted together coaxially in series on an axle to form a husker roll assembly. In forming such an assembly, husker rolls 50, 52 may be mounted coaxially adjacent to each other in the assembly such that ends of the flights extending from the husker rolls 50, 52 in the assembly are aligned. As illustrated in FIG. 1, substantially continuous flights along the length of the assembly, broken only by the helical recesses 64, are thereby formed. Alternatively, and preferably, adjacent husker rolls 50, 52 in a husker roll assembly in accordance with the present invention are positioned such that the flights 58 of adjacent husker rolls 50, 52 are not aligned. As illustrated in FIG. 7, for example, the ends of the flights 58 of husker rolls 50, 52 mounted in a multi-husker roll assembly in accordance with the present invention are preferably aligned with the grooves 60 formed between the radially extending flights 58 of adjacent husker rolls 50, 52 in the assembly. As illustrated, the ends of the radially extending flights 58 in husker rolls 50, 52 in the assembly of coaxially mounted husker rolls 50, 52 are preferably aligned approximately with the centers of the grooves 60 defined between the radially extending flights 58 of adjacent husker rolls 50, 52.

It should be understood that husker rolls in accordance with the present invention may be employed in devices for separating husks, stalks, shanks, and debris from sweet corn or seed corn. Furthermore, the husker rolls of the present invention may be employed in apparatus for removing vines and debris from harvested potatoes or twigs and related debris from citrus or other fruits, or other agricultural products.

It is understood that the present invention is not confined to the particular construction and arrangement of parts herein illustrated and described, but embraces all such modified forms thereof as come within the scope of the following claims.

What is claimed is:

1. A roll for an agricultural product separating apparatus, comprising:
   (a) an axially extending cylindrical base segment; and
   (b) a plurality of axially extending flights each of which describes less than a fraction of a complete turn along a length of the roll and which protrude radially from the cylindrical base segment, wherein each flight has a base portion and wherein the flights define grooves between the flights, and wherein the circumferential width of the grooves between the flights is larger than the circumferential width of the base portion of the flights.

2. The roll for an agricultural product separating apparatus of claim 1 wherein the circumferential width of the grooves is approximately three times the circumferential width of the base portion of the flights.

3. The roll for an agricultural apparatus of claim 1 wherein the base segment and the axially extending flights are made of a resilient material.

4. The roll for an agricultural apparatus of claim 3 wherein the base segment is mounted on a metal core cylinder.

5. The roll for an agricultural apparatus of claim 1 comprising additionally a rib which extends the length of the roll and which protrudes from the base segment and is positioned between two axially extending flights.

6. The roll for an agricultural apparatus of claim 5 wherein the rib is formed of a resilient material which overlies a metallic insert.

7. The roll for an agricultural apparatus of claim 5 wherein a circumferential width of the rib is approximately equal to a circumferential width of each of the flights and wherein the rib is positioned between two axially extending flights so as to define a groove between the rib and an adjacent flight wherein the groove has a circumferential width approximately equal to the circumferential width of the rib.

8. The roll for an agricultural apparatus of claim 1 wherein the flights of the roll define a protruding helical path along the base segment.

9. The roll for an agricultural apparatus of claim 1 wherein the base segment has a circular cross section.

10. A roll for an agricultural product separating apparatus, comprising:
  (a) an axially extending cylindrical base segment; and
  (b) a plurality of axially extending flights which protrude radially from the cylindrical base segment, wherein each flight has a base portion and wherein the flights define grooves between the flights, and wherein the circumferential width of the grooves between the flights is larger than the circumferential width of the base portion of the flights, and wherein portions of the cylindrical base segment and the flights define a helically extending recess, wherein the recess cuts across the flights and extends radially below the level of the grooves defined between the flights.

11. The roll for an agricultural apparatus of claim 10 comprising additionally a rib which extends the length of the roll and which protrudes from the base segment and is positioned between two axially extending flights, wherein the rib extends above the level of the grooves defined between the flights and into the helically extending recess.

12. An apparatus for removing the husks from ears of corn, comprising:
  (a) a frame;
  (b) a first roll rotatably mounted to the frame, wherein the first roll includes a first axially extending cylindrical base segment and a plurality of first axially extending flights each of which describes less than a fraction of a complete turn along a length of the first roll and which protrude radially from the first cylindrical base segment, wherein each of the first flights has a base portion and wherein the first flights define first grooves between the first flights, and wherein the circumferential widths of the first grooves defined between the first flights are larger than the circumferential widths of the base portions of the first flights; and
  (c) a second roll rotatably mounted to the frame parallel and adjacent to the first roll, wherein the second roll includes a second axially extending cylindrical base segment and a plurality of second axially extending flights each of which describes less than a fraction of a complete turn along a length of the second roll and which protrude radially from the second cylindrical base segment, wherein each of the second flights has a base portion and wherein the second flights define second grooves between the second flights, and wherein the circumferential widths of the second grooves defined between the second flights are larger than the circumferential widths of the base portions of the second flights, and wherein the first roll is engaged against the second roll such that when a first flight on the first roll is positioned facing the second roll and a second flight on the second roll is positioned facing the first roll the facing first and second flights are positioned adjacent to each other one above the other.

13. The apparatus for removing husks from ears of corn of claim 12 wherein the circumferential widths of the first and second grooves are approximately three times the circumferential widths of the base portions of the first and second flights, respectively.

14. The apparatus for removing husks from ears of corn of claim 12 wherein portions of the first and second cylindrical base segments and the first and second flights define first and second helically extending recesses, respectively, wherein the first and second recesses cut across the first and second flights and extend radially below the level of the first and second grooves defined between the first and second flights, respectively.

15. The apparatus for removing husks from ears of corn of claim 14 wherein the first helical recess is a left-hand helical recess and the second helical recess is a right-hand helical recess.

16. The apparatus for removing husks from ears of corn of claim 15 wherein the first and second helical recesses are formed on the first and second rolls, respectively, such that a portion of the first helical recess is always aligned with a portion of the second helical recess as the first and second rolls are rotated.

17. The apparatus for removing husks from ears of corn of claim 14 comprising additionally first and second ribs which extend along the length of the of the first and second rolls, respectively, and which protrude from the first and second base segments and are positioned between two axially extending first and second flights, respectively, wherein the first and second ribs extend above the level of the first and second grooves defined between the first and second flights and into the first and second helically extending recesses, respectively.

18. The apparatus for removing husks from ears of corn of claim 12 comprising additionally first and second ribs which extend along the length of the first and second rolls, respectively, and which protrude from the first and second base segments and are positioned between two axially extending first and second flights, respectively.

19. The apparatus for removing husks from ears of corn of claim 18 wherein the first and second ribs are formed of a resilient material which overlies a metallic insert.

20. The apparatus for removing husks from ears of corn of claim 18 wherein a circumferential width of each of the first and second ribs is approximately equal to a circumferential width of each of the first and second flights and wherein the first and second ribs are positioned between two axially extending first and second flights so as to define first and second grooves between the first and second ribs and adjacent first and second flights, respectively, wherein the first and second grooves between the first and second ribs and adjacent first and second flights have circumferential widths approximately equal to the circumferential widths of the first and second flights and are positioned on the first and second rolls such that a second flight or second rib on the second roll is engaged in the first groove between the first rib and an adjacent first flight and a first flight or first rib on the first roll is engaged in the second groove between the second rib and an adjacent second flight periodically as the first and second rolls are rotated.

21. The apparatus for removing husks from ears of corn of claim 12 wherein the first and second flights of the first and second rolls define protruding helical paths along the first and second base segments, respectively.

22. The apparatus for removing husks from ears of corn of claim 12 wherein the first and second base segments and the first and second axially extending flights are made of a resilient material.

23. The apparatus for removing husks from ears of corn of claim 12 wherein the first and second base segments are mounted on metal core cylinders.

24. The apparatus for removing husks from ears of corn of claim 12 wherein the first and second base segments have circular cross sections.

25. A roll assembly for an agricultural product separating apparatus, comprising:
   a plurality of rolls mounted adjacent and coaxially to each other, wherein each roll includes
      (a) an axially extending cylindrical base segment; and
      (b) a plurality of axially extending flights each of which describes less than a fraction of a complete turn along a length of the roll and which protrude radially from the cylindrical base segment, wherein each flight has a base portion and wherein the flights define grooves between the flights, and wherein the circumferential width of the grooves between the flights is larger than the circumferential width of the base portion of the flights.

26. The roll assembly for an agricultural product separating apparatus of claim 25 wherein the circumferential width of the grooves of each roll is approximately three times the circumferential width of the base portion of the flights of each roll.

27. The roll assembly for an agricultural product separating apparatus of claim 25 wherein an end of an axially extending flight of a one of the plurality of rolls is aligned with a groove defined between the flights of another adjacently mounted one of the plurality of rolls.

28. The roll assembly for an agricultural product separating apparatus of claim 27 wherein an end of an axially extending flight of a one of the plurality of rolls is aligned with a center of an end of a groove defined between the flights of another adjacently mounted one of the plurality of rolls.

29. A roll for an agricultural product separating apparatus, comprising:
   (a) an axially extending cylindrical base segment having an outer surface;
   (b) a plurality of axially extending flights each of which describes less than a fraction of a complete turn along a length of the roll and which protrude radially from the outer surface of the cylindrical base segment, wherein each flight has a base portion, and wherein the plurality of flights are positioned on the outer surface of the cylindrical base segment so as to define at least one groove extending axially along a length of the base segment, and wherein a circumferential width of the at least one groove is larger than the circumferential width of the base portion of the flight.

30. The roll for an agricultural product separating apparatus of claim 29 wherein the at least one groove includes an outer surface and wherein the outer surface of the at least one groove extends radially from the roll by an amount no greater than the outer surface of the base segment extends radially from the roll.

31. The roll for an agricultural product separating apparatus of claim 29 wherein the circumferential width of the at least one groove is at least three times the circumferential width of the base portion of the flight.

32. The roll for an agricultural product separating apparatus of claim 29 wherein the at least one groove is positioned between two adjacent flights protruding from the cylindrical base segment.

33. The roll for an agricultural product separating apparatus of claim 29 wherein the flights of the roll define a protruding helical path along the base segment.

34. A roll for an agricultural product separating apparatus, comprising:
   (a) an axially extending cylindrical base segment; and
   (b) a plurality of axially extending flights each of which describes less than a fraction of a complete turn along a length of the roll and which protrude radially from the cylindrical base segment, wherein each flight has a base portion, and wherein the flights define at least one groove between two adjacent flights wherein the circumferential width of the at least one groove is larger than the circumferential width of the base portion of the flight.

35. The roll for an agricultural product separating apparatus of claim 34 wherein the circumferential width of the at least one groove is at least three times the circumferential width of the base portion of the flight.

* * * * *